United States Patent
Chen et al.

(10) Patent No.: US 8,328,234 B2
(45) Date of Patent: Dec. 11, 2012

(54) AIRBAG INFLATOR

(75) Inventors: Jianlin Chen, Kanagawa (JP); Yoji Tasaki, Kanagawa (JP); Akinori Sakamoto, Kanagawa (JP); Casey Jenkins, Syracuse, UT (US); Krista Nash, South Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/125,739

(22) PCT Filed: Oct. 30, 2009

(86) PCT No.: PCT/JP2009/068684
§ 371 (c)(1),
(2), (4) Date: Jul. 5, 2011

(87) PCT Pub. No.: WO2010/050588
PCT Pub. Date: May 6, 2010

(65) Prior Publication Data
US 2011/0254255 A1    Oct. 20, 2011

(30) Foreign Application Priority Data

Oct. 30, 2008  (JP) .................................. 2008-280348

(51) Int. Cl.
*B60R 21/30* (2006.01)
(52) U.S. Cl. ........................................ 280/741; 55/525
(58) Field of Classification Search .................. 280/736, 280/741, 742; 55/486, 525; 422/167, 305; 102/530, 531
See application file for complete search history.

(56) References Cited

U.S. PATENT DOCUMENTS 5,658,517 A    8/1997  Cox et al.
(Continued)

FOREIGN PATENT DOCUMENTS

JP        9-76869          3/1997
(Continued)

OTHER PUBLICATIONS

International Search Report of PCT/JP2009/068684 mailed Dec. 15, 2009.

*Primary Examiner* — Ruth Ilan
*Assistant Examiner* — Robert A Coker
(74) *Attorney, Agent, or Firm* — Brinks Hofer Gilson & Lione (57) ABSTRACT

An airbag inflator in which a pressure vessel constituted by a base and a diffuser accommodates an igniter, a gas generating agent, a filter, and an inner cover that covers the gas generating agent and includes a bent portion that contacts an inner wall of the filter. The filter has a layered structure constituted by an inner filter and a wire mesh outer filter. The inner filter is of a cylindrical shape, in which upper and lower end portions are formed in a tapered shape that decreases in height toward an outer peripheral side. The wire mesh outer filter is fitted over an outer peripheral surface of the inner filter, excluding at least the respective end portions formed in the tapered shape, and has a slightly larger outer diameter than an inner diameter of the base. The filter is press-fitted into the base. Thus, the filter can be incorporated into the base easily. Further, close contact with the inner cover can be maintained when the diffuser and the base are integrated by welding.

7 Claims, 7 Drawing Sheets

U.S. PATENT DOCUMENTS

| | | | |
|---|---|---|---|
| 6,032,979 A | 3/2000 | Mossi et al. | |
| 6,491,321 B1* | 12/2002 | Nakashima et al. | 280/736 |
| 6,722,694 B1* | 4/2004 | Nakashima et al. | 280/736 |
| 6,739,621 B2* | 5/2004 | Parkinson et al. | 280/741 |
| 7,452,397 B2* | 11/2008 | Hirata | 55/525 |
| 7,763,092 B2* | 7/2010 | Koyama et al. | 55/487 |
| 2001/0042298 A1 | 11/2001 | Katsuda et al. | |
| 2003/0057687 A1* | 3/2003 | Nakashima et al. | 280/736 |
| 2003/0222443 A1 | 12/2003 | Cheal et al. | |
| 2005/0151357 A1* | 7/2005 | Yamazaki | 280/741 |
| 2005/0225064 A1* | 10/2005 | Suehiro et al. | 280/741 |
| 2009/0184504 A1 | 7/2009 | Greenwood et al. | |

FOREIGN PATENT DOCUMENTS

| | | |
|---|---|---|
| JP | 10-263336 | 10/1998 |
| JP | 2005-67520 | 3/2005 |
| JP | 2005-178599 | 7/2005 |
| JP | 2005-212606 | 8/2005 |

* cited by examiner

Fig. 3   Press-Fitting Complete

Fig. 4

Fig. 5A
(prior art)
Hot

Fig. 5B
Hot

Press-Fitting Impossible

AIRBAG INFLATOR

BACKGROUND

1. Field of the Invention

The present invention relates to an inflator for generating a gas that is supplied to an airbag disposed in an automobile as a safety device.

2. Related Technology

An airbag device is constituted by an inflator serving as a gas generating device and an airbag, and protects an occupant from an impact generated during a collision by deploying the airbag using gas generated by the inflator.

Figure 6:
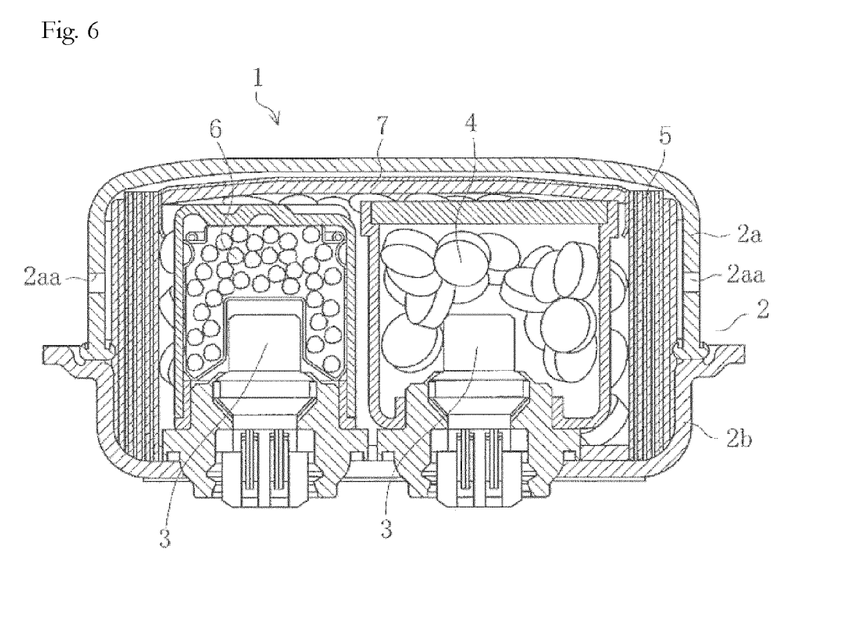
FIG. 6 is a sectional view illustrating a structure of a dual stage type inflator.

FIG. 6 is a sectional view illustrating a structure of a dual stage type inflator 1. In the inflator 1, a pressure vessel 2 constituted by a diffuser 2a and a base 2b accommodates an igniter 3 that is activated by an electric signal generated when a collision is detected and a gas generating agent 4 that is ignited by the igniter 3 to generate a large amount of gas instantaneously.

During the collision, the generated gas is discharged from a gas discharge hole 2aa provided in the diffuser 2a and introduced into an airbag, whereby the airbag is deployed. However, the gas contains a large amount of solid residue, and therefore, in order to protect the health of the occupants and the airbag, the solid residue is collected by passing the gas through a filter 5, and the gas is cooled.

Patent Document 1: Japanese Patent Application Publication H9-76869

A reference numeral 6 in FIG. 6 denotes an ignition charge that amplifies and transfers an ignition energy of the igniter 3 instantaneously in order to burn the gas generating agent 4. Further, 7 denotes an inner cover for preventing the gas generating agent 4 from spilling out when the diffuser 2a is welded to the base 2b and preventing the gas from leaking out from an upper end of the filter 5 when the inflator 1 is activated.

Figure 7:
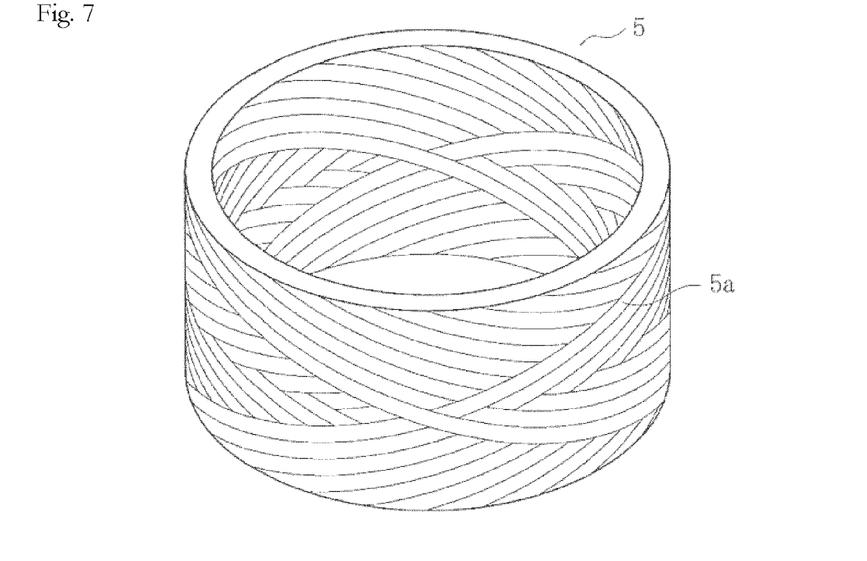
FIG. 7 is a perspective view illustrating a structure of a wire wound filter that has come into use recently.

Incidentally, wire wound filters have recently come into use as the filter 5. As shown in FIG. 7, a wire wound filter is formed by winding metal wire 5a diagonally into a cylindrical shape and then fixing the metal wire 5a in the cylindrical shape by sintering. A wire wound filter basically has the structure of a spring and therefore deforms extremely easily in a height direction.

Hence, when the wire wound filter is press-fitted into the base of the pressure vessel, the metal wire is likely to rise up and accumulate directly behind a part that has entered the base, thereby generating a large frictional force. To counter this frictional force, therefore, a large press-fitting force is required.

However, when a large press-fitting force is applied, the filter deforms greatly in the height direction, and as a result, a permeability of the filter may be adversely affected such that the inflator is not activated correctly. Therefore, when a wire wound filter is employed, the press-fitting characteristic into the base must be improved.

Figure 8:
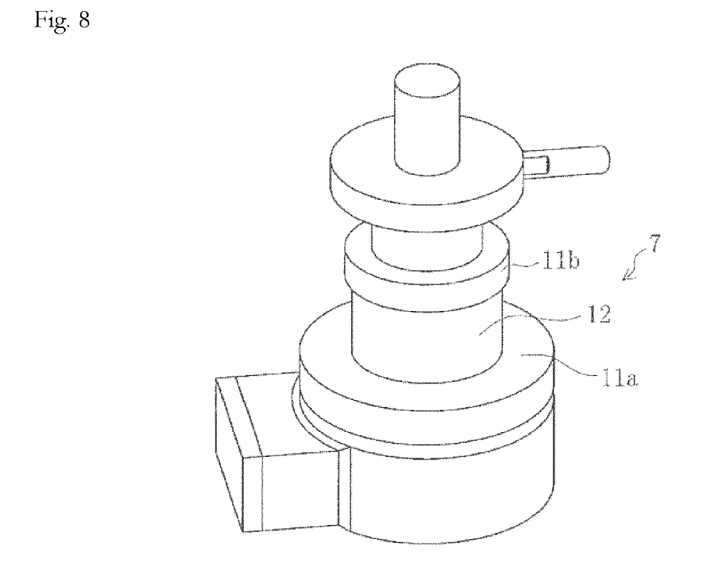
FIG. 8 is a schematic view of a filter test device.

Using a test device 7 shown in FIG. 8, in which a test sample 12 carried on a load cell 11a is pressed by a hand press 11b, deformation of three identical wire wound filters C, D, E was measured. Measurement results are shown in FIG. 9.

Figure 9:
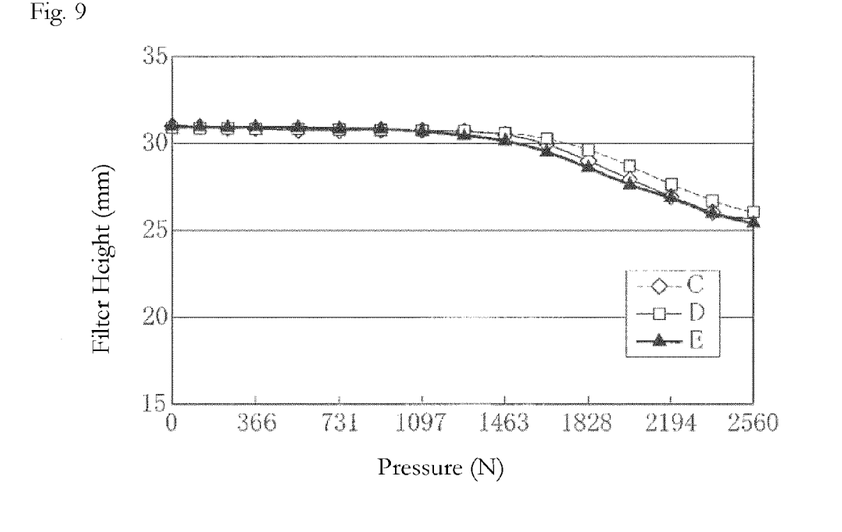
FIG. 9 is a view showing a deformation curve of a wire wound filter.

It is evident from FIG. 9 that when the pressure exerted on the wire wound filter exceeds 1097 N, the wire wound filter starts to deform greatly. Therefore, when press-fitting the wire wound filter into the base, the press-fitting pressure must be controlled to or below 1097 N.

Meanwhile, a wire wound filter formed with an outer diameter of 64.26 mm (design value: 64.1±0.25 mm) and a height of 31.02 mm using metal wire having a diameter of 0.36 mm was press-fitted into a base having an inner diameter of 63.72 mm at 1097 N using the test device described above.

Figure 10:
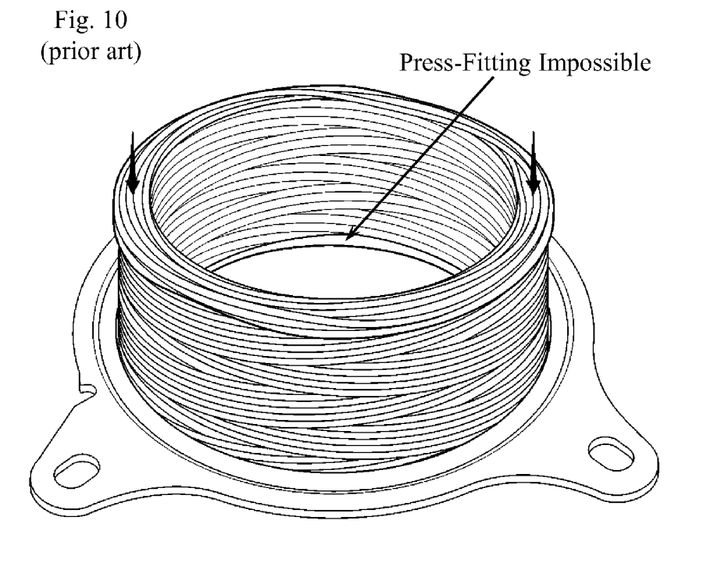
FIG. 10 is a view showing a wire wound filter following a press-fitting test.

It was found as a result that even though the outer diameter of the wire wound filter was within a design dimension tolerance, an inner peripheral portion on an upper side of the paper surface, indicated by a thin arrow in FIG. 10, could not be press-fitted into the base at a pressure of 1097 N. In other words, the filter could not be press-fitted into the base even when sufficient pressure for deforming the filter was applied. Note that a direction indicated by a thick arrow in FIG. 10 is a pressure application direction.

SUMMARY OF THE INVENTION

An object of the present invention is to improve a press-fitting characteristic of a wire wound filter when the wire wound filter is press-fitted into a base of a pressure vessel.

To ensure that a wire wound filter can be press-fitted easily into a base of a pressure vessel, principal features of an airbag inflator according to the present invention, in which a pressure vessel formed by integrally welding a diffuser to a base accommodates an igniter and a gas generating agent, a filter disposed along an inner peripheral wall of the pressure vessel, and an inner cover that covers the gas generating agent and includes a bent portion that contacts an inner wall of the filter, are that the filter has a layered structure constituted by an inner filter in which upper and lower end surfaces of a wire wound filter wound into a cylindrical shape are formed in a tapered shape that decreases in height toward an outer peripheral side, and a wire mesh outer filter that is fitted over an outer peripheral surface of the inner filter, excluding at least respective end portions formed in the tapered shape, and has a slightly larger outer diameter than an inner diameter of the base, and that the filter is press-fitted into the base.

In the inflator according to the present invention, the outer peripheral surface of the inner filter, excluding at least the respective end portions formed in the tapered shape, is covered by the wire mesh outer filter, which is not a wire wound filter and has a slightly larger outer diameter than the inner diameter of the base, and therefore the filter can be press-fitted into the base easily.

Further, by forming the upper and lower end surfaces of the inner filter in a tapered shape that decreases in height toward the outer peripheral side, crushing of an inner diameter side of the inner filter when the diffuser is integrated with the base by welding can be effectively suppressed, and therefore close contact with the inner cover can be maintained.

By ensuring that the tapered shape on a lower end side of the filter contacts an inner wall of the base in alignment with a shape thereof when the filter is press-fitted into the base, the filter remains in close contact with the base without gaps, and therefore flaming and the like can be prevented.

Further, by setting a height of the inner filter such that an outer peripheral end of the inner filter does not contact an inner wall of the diffuser integrated with the base, crushing of the inner diameter side of the inner filter can be suppressed more completely.

According to the present invention, the outer periphery of the inner filter formed from wound wire is covered by the wire mesh outer filter, which is not a wire wound filter, and therefore, when the filter is press-fitted into the base, metal wire thereof is less likely to rise up and less likely to accumulate directly behind a part that has entered the base. In addition, the outer diameter of the outer filter is set to be slightly larger than the inner diameter of the base, and therefore the filter can be press-fitted into the base easily.

Further, the upper and lower end surfaces of the inner filter are formed in a tapered shape that decreases in height toward the outer peripheral side, and therefore crushing of the inner diameter side of the inner filter can be suppressed effectively when the filter is press-fitted and the diffuser and base are integrated by welding. Moreover, by ensuring that the filter contacts the inner walls of the base and the diffuser in alignment with the shapes thereof, close contact can be maintained with the inner cover. Hence, when the inflator is activated, gaps that cause flaming are not formed, and therefore flaming can be prevented.

BRIEF DESCRIPTION OF THE DRAWINGS

FIG. 4 is a view illustrating a relationship between an inner filter and an inner cover, FIGS. 4A and 4B showing a conventional example, wherein FIG. 4A shows a case in which an outer peripheral end of an inner filter not having a tapered portion is pressed down such that a height thereof decreases and FIG. 4B shows a case in which the inner cover expands upon activation of the inflator such that a gap is formed between the inner cover and an upper end of the inner filter not having a tapered portion, and FIGS. 4C to 4F showing an embodiment of the present invention, wherein FIG. 4C is a view showing a positional relationship between a lower end of the filter and a base prior to press-fitting into the base, FIG. 4D is similar to FIG. 4C but shows a condition following press-fitting into the base, FIG. 4E is a view showing a positional relationship between an upper end of the filter and a diffuser before the diffuser is welded to the base, and FIG. 4F is similar to FIG. 4E but shows a condition after the diffuser is welded to the base;

FIG. 5 is a view showing damage to the filter after the inflator has been activated, FIG. 5A showing a case in which a conventional wire wound filter is employed and FIG. 5B showing a case in which the filter according to the present invention is employed;

DETAILED DESCRIPTION

In the present invention, the object of ensuring that a wire wound filter can be press-fitted into a base of a pressure vessel easily is realized by covering an outer periphery of an inner filter formed from wound wire with a wire mesh outer filter having a slightly larger outer diameter than an inner diameter of the base.

An embodiment of the present invention will be described below using FIGS. 1 to 5.

Figure 1:
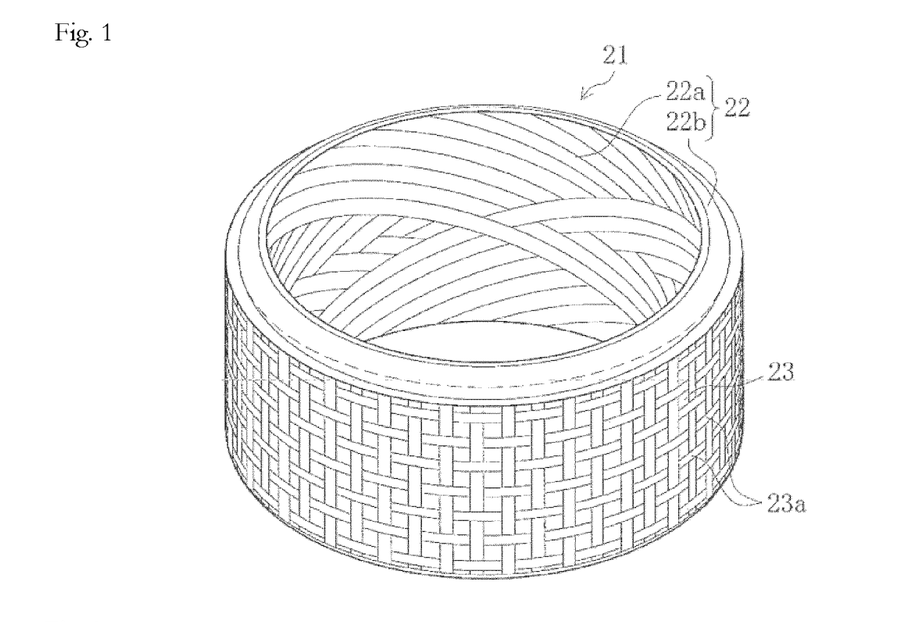
FIG. 1 is a view of a filter serving as a constitutional element of an inflator according to the present invention from diagonally above.

FIG. 1 is a view of a filter serving as a constitutional element of an inflator according to the present invention from diagonally above. A filter 21 provided in the inflator of the present invention has a two-layer structure constituted by an inner filter 22 and an outer filter 23.

The inner filter 22 thereof is a wire wound filter formed by winding metal wire 22a diagonally into a cylindrical shape and then fixing the metal wire 22a in the cylindrical shape by sintering, for example, in which upper and lower end surfaces of the cylinder are formed in a tapered shape that decreases in height toward an outer peripheral side. The parts formed in a tapered shape will be referred to hereafter as tapered portions 22b.

The outer filter 23, on the other hand, is not a wire wound filter and is constituted by 18-mesh wire gauze, for example, which is rougher than the inner filter 22. The outer filter 23 is fitted over an outer peripheral surface of the inner filter 22, excluding the tapered portions 22b on the respective end portions thereof, and has a slightly larger outer diameter than an inner diameter of a base provided on a pressure vessel.

By forming the filter 21 in this manner, the metal wire 22a of the inner filter 22 does not rise up when the filter 21 is press-fitted into the base, and therefore the filter 21 can slide into the base easily, enabling a large reduction in press-fitting pressure. As a result, deformation of the filter 21 during press-fitting decreases.

By making metal wire 23a of the outer filter 23 thicker than the metal wire 22a of the inner filter 22 at this time, an improvement in thermal resistance is achieved. As a result, wire breakage on a surface of the filter near a gas discharge hole of a diffuser, which occurs easily when a conventional wire wound filter is employed, can be prevented effectively.

Figure 2:
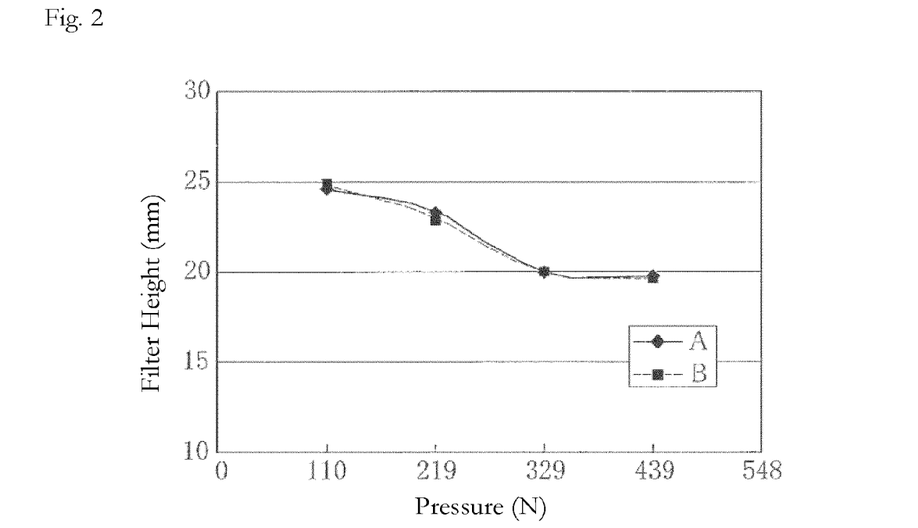
FIG. 2 is a view showing a press-fitting curve generated during a press-fitting test performed on the filter serving as a constitutional element of the inflator according to the present invention.

Two of the filters 21 (outer diameter: 64.3 mm) employing two outer filters A, B having following dimensions and constitutions were press-fitted into a base having an inner diameter of 63.72 mm using a test device shown in FIG. 8. As shown in FIG. 2, it was found that the pressure applied at a point where the filter 21 reached a bottom of the base was approximately 329 N.

The internal filter was a wire wound filter formed into a cylindrical shape having an outer diameter of 61.3 mm and a height of 30.25 mm using metal wire having a diameter of 0.36 mm.

The outer filter was wire mesh formed into a cylindrical shape having an outer diameter of 64.3 mm and a height of 26.9 mm using metal wire having a diameter of 0.5 mm.

Figure 3:
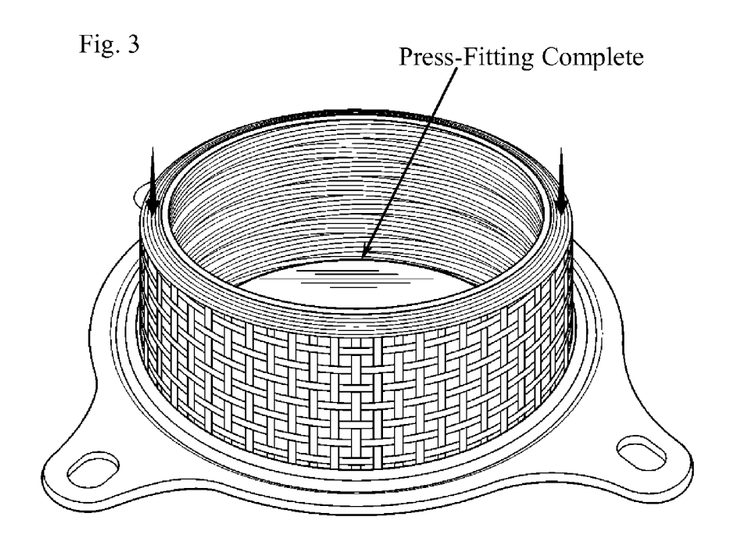
FIG. 3 is a view showing the filter serving as a constitutional element of the inflator according to the present invention after being press-fitted into a base.
Figure 4:
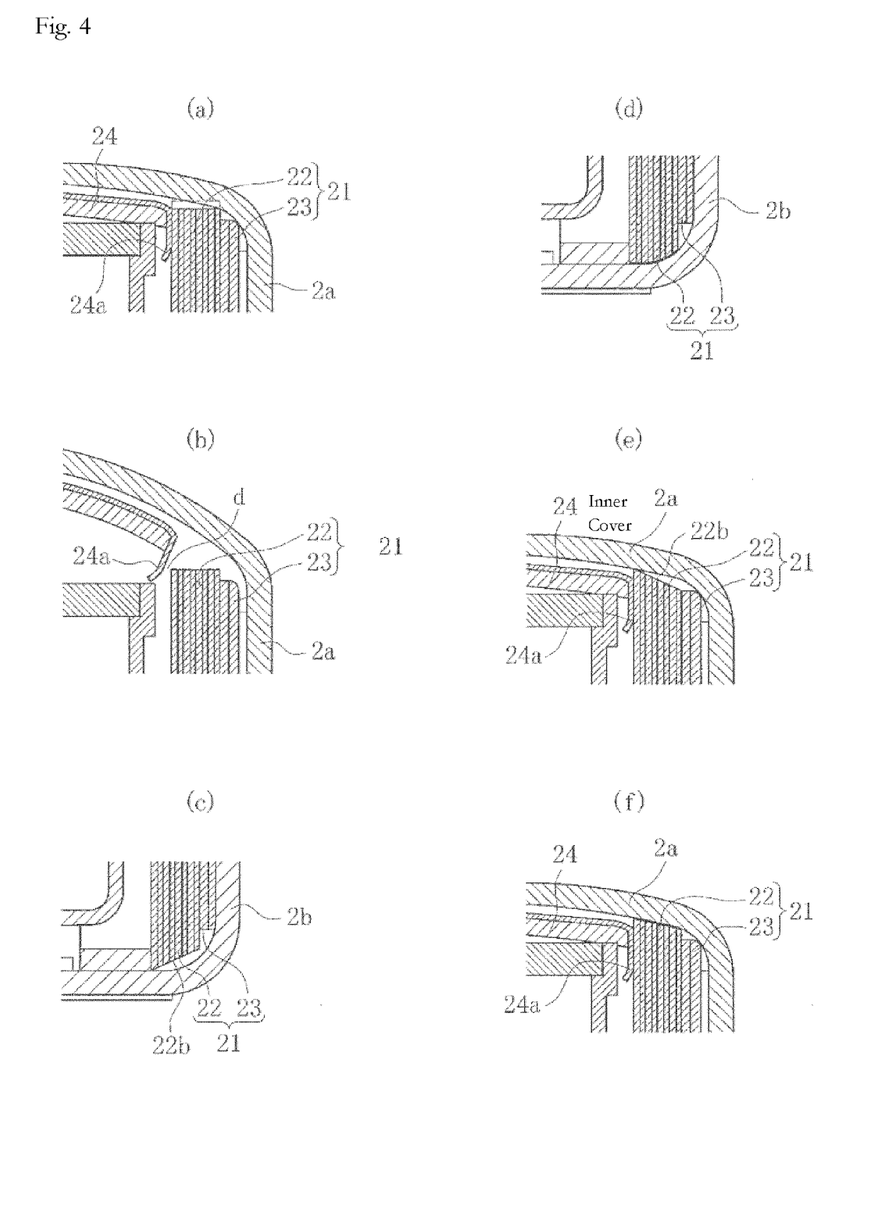

Hence, where 329 N of pressure was exerted on the filter 21 using the test device shown in FIG. 8, an inner peripheral portion thereof on an upper side of a paper surface, indicated by a thin arrow in FIG. 3, was completely press-fitted into the base. Note that a direction indicated by a thick arrow in FIG. 3 is a pressure application direction.

Incidentally, when a diffuser 2a is welded to the base and an outer peripheral end of the inner filter 22 contacts the diffuser 2a, the inner filter 22 is pressed down such that the upper end of the inner filter 22 decreases in height from a state indicated by an imaginary line in FIG. 4A to a state indicated by a solid line.

When the height of the inner filter 22 decreases, a gap d is formed between an inner cover 24 and the upper end of the inner filter 22 upon expansion of the inner cover 24 following activation of the inflator, as shown in FIG. 4B, and as a result, flaming may occur.

Hence, in the present invention, as shown in FIGS. 4C and 4E, the tapered portion 22b that decreases in height toward the outer peripheral side is formed on the upper and lower end surfaces of the inner filter 22, and a folded back portion 24a of the inner cover 24 is formed to be long enough to remain in contact with an inner wall of the inner filter 22 following activation of the inflator. In this case, the height of the inner filter 22 is preferably set such that the outer peripheral end of the inner filter 22 does not contact the inner wall of the diffuser 2a.

By employing this constitution, when the filter 21 is press-fitted into a base 2b, the tapered portion 22b on the lower end side of the inner filter 22 contacts an inner wall of the base 2b in alignment with a shape thereof, as shown in FIG. 4D. Further, when the diffuser 2a is welded to the base 2b, the tapered portion 22b on the upper end side of the inner filter 22 contacts an inner wall of the diffuser 2a in alignment with a shape thereof, as shown in FIG. 4F, and therefore the height of the inner filter 22 does not decrease. Hence, even when the inner cover 24 expands upon activation of the inflator, the gap d is not formed between the inner cover 24 and the upper end of the inner filter 22, and as a result, flaming does not occur.

Figure 5A:
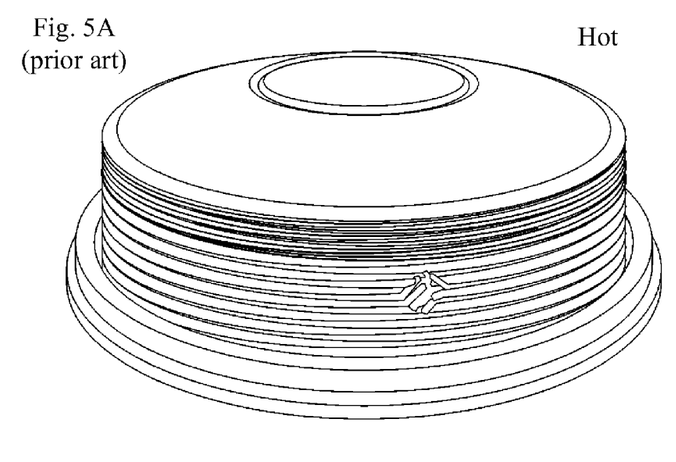
Figure 5B:
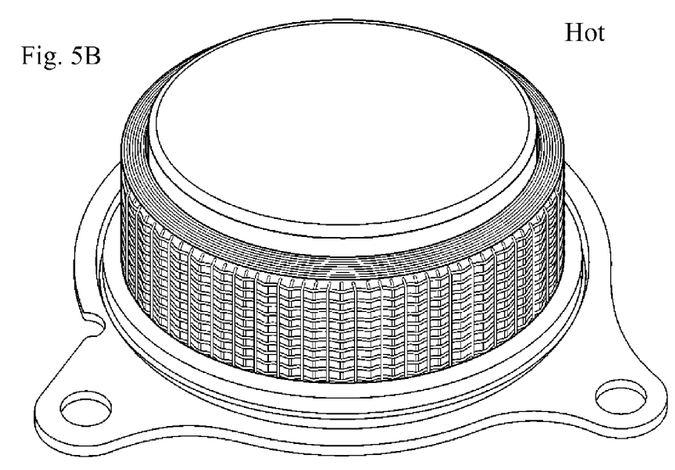

FIG. 5 shows damage to a conventional wire wound filter and the filter of the present invention following activation of inflators employing the respective filters. As shown in FIG. 5A, when a conventional wire wound filter was used, the metal wire near the gas discharge hole of the diffuser was damaged. When the filter of the present invention was used, as shown in FIG. 5B, on the other hand, no damage was found on the filter.

The present invention is not limited to the example described above and may be modified appropriately within the scope of the technical spirit set forth in the claims.

In other words, the airbag inflator described above is merely a preferred example of the present invention, and the present invention may be implemented or executed in other embodiments using various methods. Unless specific limiting description is provided to the contrary in the specification of this application, the present invention is not limited to the component shapes and sizes, constitutional arrangements, and so on illustrated in detail in the attached drawings. Moreover, expressions and terminology used in the specification are employed for descriptive purposes, and unless specific limiting description is provided to the contrary, the present invention is not limited thereto.

For example, the mesh of the outer filter 23 is not limited to the example described above. Further, as the inner filter 22 a columnar filter made of expanded metal having various mesh openings may be employed in place of a wire wound filter.

Expanded metal having various mesh openings is wire mesh in which a plurality of mesh opening regions including mesh openings of various sizes, shapes, and pitches are formed on a metal plate (US 2009/0184504 A1, for example), and is typically known as variable expanded metal (VEM). When a columnar filter made of expanded metal is used as the inner filter, press-fitting into the base 2b can be performed more easily than when a wire wound filter is used. Further, the end portions deform appropriately in accordance with the shape of the pressure vessel, and therefore flaming can be suppressed more reliably. Moreover, an improvement in filter performance (trapping of combustion residue and suppression of temperature increases) is achieved in comparison with a case in which a wire wound filter is used as the inner filter.

Furthermore, the inflator is not limited to a dual stage type inflator, and a single stage type inflator may be used. Moreover, in the embodiment, a two-layer structure constituted by the inner filter 22 and the outer filter 23 is employed, but the respective filters may be provided in multiple layers where appropriate to obtain a layered structure constituted by a total of three or more layers.

The invention claimed is:

1. An airbag inflator comprising:
   a pressure vessel, formed by integrating a diffuser to a base, having an igniter and a gas generating agent located therein,
   a filter disposed along an inner peripheral wall of the pressure vessel in press-fit engagement with the base, and
   an inner cover including a bent portion that contacts an inner wall of the filter to cover and retain said gas generating agent within the filter and the base,
   the filter having a layered structure constituted by an inner filter and an outer filter, the inner filter being of a cylindrical shape in which upper and lower end portions are formed in a tapered shape that decreases in height toward an outer peripheral side of the cylindrical shape, the outer filter being a wire mesh outer filter that is fitted over an outer peripheral surface of said inner filter excluding at least the upper and lower end portions formed in the tapered shape, and the outer filter having a slightly larger outer diameter than an inner diameter of said base, and
   wherein the bent portion of the inner cover is formed to a length that it remains in contact with the inner wall of the filter following activation of the inflator.

2. The airbag inflator according to claim 1, characterized in that the tapered shape on a lower end side of said inner filter contacts an inner wall of said base in alignment with a shape thereof when the filter is in press-fit engagement with the base.

3. The airbag inflator according to claim 2, characterized in that the inner filter has a height such that the outer peripheral side of the inner filter does not contact an inner wall of the diffuser when the diffuser is integrated with the base.

4. The airbag inflator according to claim 1, characterized in that the inner filter is formed from a columnar filter constituted by expanded metal having various mesh openings.

5. The airbag inflator according to claim 1, characterized in that the inner filter is a wire wound filter wound into the cylindrical shape.

6. The airbag inflator according to claim 1, characterized in that the inner filter has a height such that the outer peripheral side of the inner filter does not contact an inner wall of the diffuser when the diffuser is integrated with the base.

7. The airbag inflator according to claim 1, characterized in that the base is welded to the diffuser.

* * * * *